United States Patent
Tanaka et al.

(10) Patent No.: US 6,693,673 B1
(45) Date of Patent: Feb. 17, 2004

(54) DIGITAL CAMERA FOR ADJUSTING CHARGE ACCUMULATION TIME IN RESPONSE TO OBJECT DISTANCE

(75) Inventors: Toshiyuki Tanaka, Nishinomiya (JP); Toshihiro Hamamura, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/361,864

(22) Filed: Jul. 27, 1999

(30) Foreign Application Priority Data

Jul. 28, 1998 (JP) ........................................ H10-212376

(51) Int. Cl.⁷ .................... H04N 5/222; H04N 5/238; H04N 9/73; G03B 15/02; G03B 7/00
(52) U.S. Cl. .................... 348/371; 348/346; 348/223.1; 396/61; 396/67
(58) Field of Search ................................ 348/370, 371, 348/366, 363, 348, 216.1, 223.1, 296; 396/61, 62, 67

(56) References Cited

U.S. PATENT DOCUMENTS

| | | | |
|---|---|---|---|
| 4,768,876 A | * 9/1988 | Okino .......................... 348/371 |
| 4,878,081 A | * 10/1989 | Kishida et al. ............ 396/106 |
| 5,005,042 A | * 4/1991 | Sato et al. .................... 396/166 |
| 5,097,340 A | * 3/1992 | Tanabe et al. ............... 348/371 |
| 5,255,049 A | * 10/1993 | Akimoto et al. ............ 396/236 |
| 5,341,220 A | * 8/1994 | Juen ............................. 348/296 |
| 5,438,363 A | * 8/1995 | Ejima et al. .............. 348/223.1 |
| 5,471,242 A | * 11/1995 | Kondo .................... 348/224.1 |
| 5,528,333 A | * 6/1996 | Lee .............................. 396/165 |
| 5,550,587 A | * 8/1996 | Miyadera ................. 348/223.1 |
| 5,568,194 A | * 10/1996 | Abe .......................... 348/223.1 |
| 5,617,175 A | * 4/1997 | Asakura et al. ............. 396/166 |
| 5,774,747 A | * 6/1998 | Ishihara et al. ................ 396/61 |
| 5,848,303 A | * 12/1998 | Jeong et al. .................... 396/61 |
| 6,278,490 B1 | * 8/2001 | Fukuda et al. .............. 348/370 |
| 6,359,651 B1 | * 3/2002 | Yokonuma ................... 348/370 |

FOREIGN PATENT DOCUMENTS

| | | | | |
|---|---|---|---|---|
| JP | 01207729 A | * 8/1989 | ............ G03B/7/16 |
| JP | 07222049 | 8/1995 | |
| JP | 08190120 A | * 7/1996 | ............ G03B/7/16 |
| JP | 08286226 A | * 11/1996 | ............ G03B/7/16 |
| JP | 10145799 | 5/1998 | |
| JP | 11305282 A | * 11/1999 | ............ G03B/7/16 |

* cited by examiner

Primary Examiner—Wendy R. Garber
Assistant Examiner—John M Villecco
(74) Attorney, Agent, or Firm—Sidley Austin Brown & Wood LLP

(57) ABSTRACT

In a digital camera, when flash shooting is performed, a maximum distance at which a subject can be illuminated to appropriate brightness is calculated based on the guide number of a flash and the open aperture value of an aperture stop, and the distance to the subject measured is compared with the maximum distance. If the distance to the subject is equal to or shorter than the maximum distance, the exposure time is set at a predetermined value, and the amount of the flash light emitted is controlled based on the amount of the light reflected from the subject, and white balance of the taken image is adjusted in accordance with the color characteristics of the flash light. If the distance to the subject is greater than the maximum distance, the exposure time is set to be longer than the predetermined value in order to use a larger amount of ambient light to illuminate the subject, and white balance of the taken image is adjusted in accordance with the color characteristics of the ambient light.

12 Claims, 5 Drawing Sheets

DIGITAL CAMERA FOR ADJUSTING CHARGE ACCUMULATION TIME IN RESPONSE TO OBJECT DISTANCE

This application is based on application No. H10-212376 filed in Japan on Jul. 28, 1998, the entire content of which is hereby incorporated by reference.

BACKGROUND OF THE INVENTION

1. Field of the Invention

The present invention relates to a digital camera, and more particularly to a digital camera capable of flash shooting.

2. Description of the Prior Art

Conventionally, digital cameras are known that are provided with an image sensor having a two-dimensional array of CCDs (charge-coupled devices). A digital camera of this type senses the light coming from a subject and takes in, as an image signal, an electric signal whose level varies in accordance with the amount of the light sensed. In shooting, in accordance with the brightness of the subject, the exposure time (the shutter speed) and the aperture value of the CCD are set in such a way that, the lower the brightness of the subject, the wider the aperture and the longer the exposure time. In this way, shooting is performed under appropriate exposure conditions.

When the subject is so dark that, even if the aperture is made fully open and the exposure time is set at the maximum within the range that does not cause a hand shake (hereafter the exposure time thus set is referred to as the maximum hand-shake-free period), the subject image taken suffers from underexposure, flash shooting is performed by emitting flash light during photoelectric conversion to illuminate the subject. Flash shooting is performed with the exposure time fixed at a predetermined value, for example 1/60 seconds. The brightness of the subject is controlled by adjusting the amount of the flash light emitted. Some cameras adopt automatic light amount adjustment in which the flash light reflected from the subject is detected to stop flash light emission when the amount of light detected reaches a predetermined value.

The image signal obtained from the image sensor is converted into a digital signal, and is thereafter subjected to color adjustment, i.e. white balance adjustment, in order to faithfully reproduce the white areas of the image. In normal shooting without flash light emission, white balance adjustment is performed for every image in accordance with the color characteristics (wavelength distribution) of ambient light. On the other hand, in flash shooting, white balance adjustment is performed uniformly in accordance with the color characteristics of the flash light.

Quite naturally, there is an upper limit to the amount of flash light a flash can emit. Moreover, the farther the subject lies away from the camera, the less flash light the subject receives. Thus, when the subject lies considerably far away from the digital camera, even if the maximum amount of flash light is emitted, it is impossible to illuminate the subject to appropriate brightness, with the result that the subject image taken suffers from underexposure. In such a case, in most conventional digital cameras, the subject can not be shot with appropriate exposure; that is; even if the subject is illuminated with flash light, degradation of the image quality is inevitable.

SUMMARY OF THE INVENTION

An object of the present invention is to provide a digital camera that can shoot an image with appropriate exposure irrespective of the distance to the subject even in flash shooting and that can achieve proper white balance adjustment in images shot by flash shooting at all times.

To achieve the above objects, according to one aspect of the present invention, a digital camera is provided with a photoelectric conversion device, a flash, and a time setter. The photoelectric conversion device senses light from a subject to generate image data of the subject. The flash emits light to illuminate the subject. The time setter sets, when shooting is performed using the light emitted by the flash, a photoelectric conversion time for which the photoelectric conversion device performs photoelectric conversion in accordance with the distance to the subject. When the subject is close to the camera, it can be illuminated to appropriate brightness with the flash light, even if the photoelectric conversion time is set to be short as in the conventional cameras. In the camera, when the subject is too far away from the camera to be illuminated to the predetermined brightness with the flash light, it is possible to set the photoelectric conversion time to be longer so that a large amount of ambient light is utilized for illuminating the subject. Thus, irrespective of the distance to the subject, it is always possible to obtain images in which the brightness of the subject is appropriate.

According to another aspect of the present invention, a digital camera is provided with a photoelectric conversion device, a flash, a first time setter, a second time setter, a first balance adjuster, and a second balance adjuster. The photoelectric conversion device senses light from a subject to generate image data of the subject. The flash emits light to illuminate the subject. The first time setter sets, when shooting is performed using the light emitted by the flash, a photoelectric conversion time for which the photoelectric conversion device performs photoelectric conversion to be equal to a predetermined length of time when the distance to the subject is equal to or shorter than a predetermined distance that corresponds to the guide number of the flash. The second time setter sets, when shooting is performed using the light emitted by the flash, the photoelectric conversion time for which the photoelectric conversion device performs photoelectric conversion to be longer than the predetermined length of time when the distance to the subject is longer than the predetermined distance. The first balance adjuster performs white balance adjustment on the image data generated by the photoelectric conversion device based on the color characteristics of the light emitted by the flash when the distance to the subject is equal to or shorter than the predetermined distance. The second balance adjuster performs white balance adjustment on the image data generated by the photoelectric conversion device based on the color characteristics of ambient light when the distance to the subject is longer than the predetermined distance. When flash shooting is performed with the predetermined photoelectric conversion time, the flash light becomes dominant in illuminating the subject. In contrast, when flash shooting is performed with the photoelectric conversion time longer than the predetermined photoelectric conversion time, the ambient light becomes dominant in illuminating the subject. Since white balance adjustment is performed based on the color characteristics of the dominant light, it is always possible to obtain images of good color quality.

According to still another aspect of the present invention, a digital camera shoots an image by means of a photoelectric conversion device and is capable of performing flash shooting by emitting flash light to illuminate a subject, during photoelectric conversion. In flash shooting, in this digital camera, when the subject lies within the distance range in which the flash light can illuminate the subject with predetermined brightness, the photoelectric conversion time for which the photoelectric conversion device performs photoelectric conversion is set to be equal to a predetermined length of time, and, when the subject lies outside the predetermined distance range, the photoelectric conversion time for which the photoelectric conversion device performs photoelectric conversion is set to be longer than the predetermined length of time.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
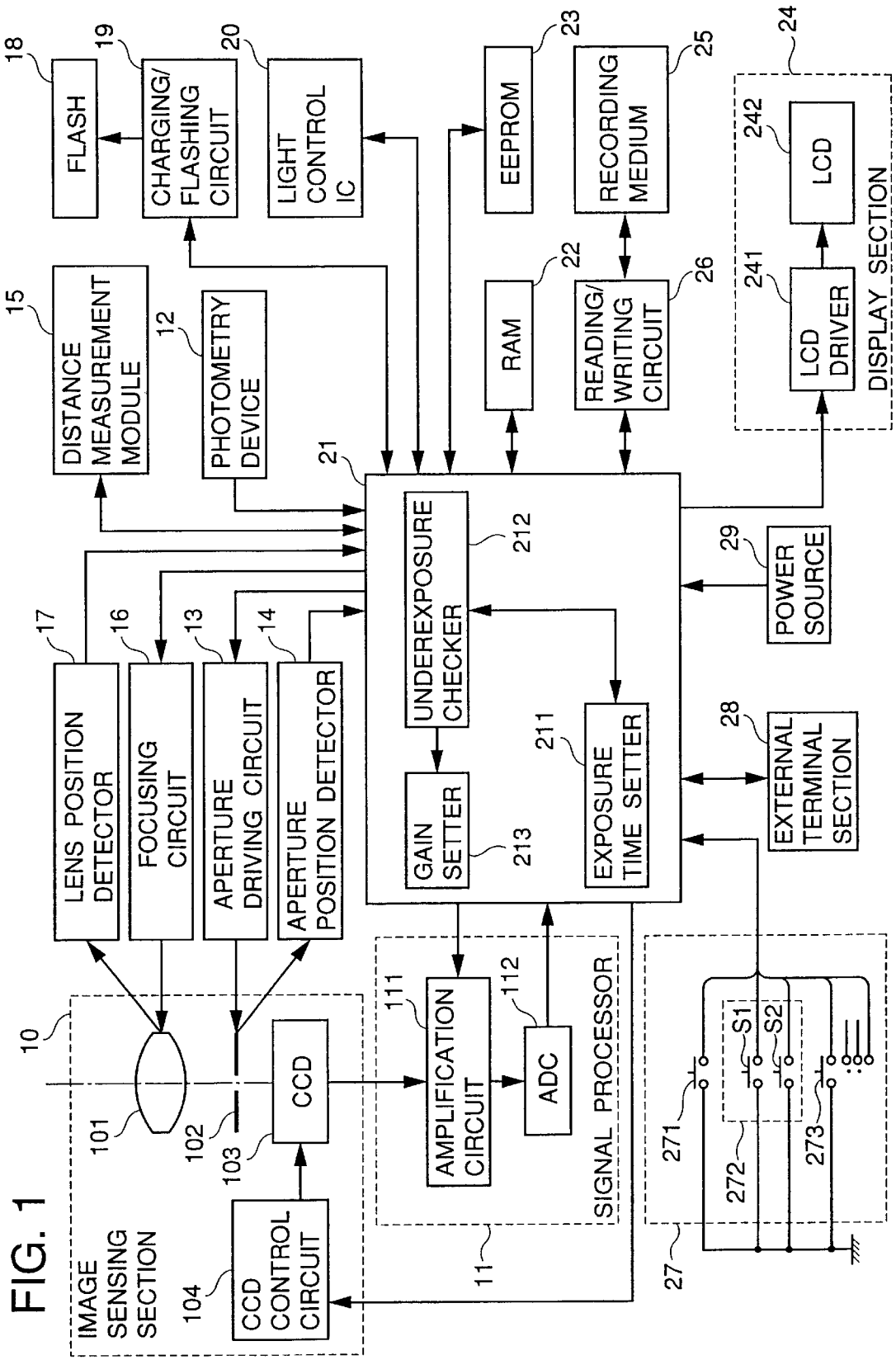
FIG. 1 is a block diagram schematically showing the configuration of the digital camera of an embodiment of the present invention.

Hereinafter, a digital camera embodying the present invention will be described with reference to the drawings. FIG. 1 is a block diagram schematically showing the configuration of the digital camera of this embodiment. In FIG. 1, an image sensing section 10 is composed of a taking lens 101, an aperture stop 102, a CCD 103, and a CCD control circuit 104. The image sensing section 10 takes in a subject image as an image signal. The taking lens 101 focuses the light coming from the subject onto the light-sensing surface of the CCD 103, which performs photoelectric conversion. The aperture stop 102 adjusts the amount of light the CCD 103 receives.

The CCD 103 has a two-dimensional array of a large number of photoelectric conversion devices (CCDs, for example), and has a single-plate-type color filter disposed on the front surface thereof. The CCD 103 senses the subject image focused by the taking lens 101 and, in accordance with the amount of the light sensed, outputs electric signals individually representing the light components of three primary colors (R, G, B). Under the control of the CCD control circuit 104, the CCD 103 performs photoelectric conversion, i.e. electric charge accumulation, and feeds the pixel signals obtained from the individual photoelectric conversion devices as a result of electric charge accumulation to a signal processor 11. In the CCD 103, the photoelectric conversion time (the exposure time) is variable and is set by an MPU (a microprocessor unit) 21, which will be described later.

Note that it is possible to use, as the aperture stop 102, an aperture stop composed of a plurality of blades so as to allow continuous setting of the aperture value as is used in a lens unit or the like for a silver-halide-film SLR camera. It is also possible to use an aperture stop of a roulette type formed as a rotatable roulette having a plurality of apertures of different sizes formed thereon so as to allow stepwise setting of the aperture value.

The signal processor 11 is composed of an amplification circuit 111 and an ADC (an analog-to-digital (A/D) converter) 112. The amplification circuit 111 amplifies the individual pixel signals fed from the CCD 103 at a predetermined gain. The ADC 112 converts the pixel signals thus amplified into pixel data. The gain of the amplification circuit 111 is set by the MPU 21.

A photometry device 12 is an exposure meter employing a photo sensor such as CdS (cadmium sulfide) and senses the light coming from the subject to perform photometry. The signal obtained as a result of photometry is taken in as photometry data by the MPU 21. An aperture driving circuit 13 sets the aperture stop 102 at the position corresponding to a control aperture value. An aperture position detector 14 is an encoder or the like for detecting the aperture position of the aperture stop 102 and feeds the detected information on the aperture position to the MPU 21.

A distance measurement module 15 is an ambient-light passive module composed, for example, of a pair of line sensors that sense the light coming from the subject. In response to a distance measurement command from the MPU 21, the distance measurement module 15 senses the subject image by means of the pair of line sensors to obtain distance measurement data, which represents the distance to the subject, on the basis of the deviation of the subject image between the two line sensors. The distance measurement data thus obtained is taken in by the MPU 21. A focusing circuit 16 drives the taking lens 101 to the in-focus position in accordance with the defocus amount fed from the MPU 21. A lens position detector 17 is an encoder or the like for detecting the position of the taking lens 101 and outputs the information on the detected lens position to the MPU 21.

The distance measurement module 15 does not necessarily have to be realized by the use of an ambient-light passive module as mentioned above. It is also possible to use instead an active-type module composed, for example, of an LED (a light emitting diode) and a PSD (a position sensing device) for sensing the light emitted by the LED and reflected from the subject so that distance measurement data, which represents the distance to the subject, is obtained on the basis of the light-sensing position of the PSD.

A flash 18 is composed of a white light source such as an Xe (xenon) lamp. A charging/flashing circuit 19, which is provided with a capacitor (not shown) for charging, starts charging in response to a charge command from the MPU 21, and then, in response to a trigger signal from the MPU 21, starts to supply the charged electric power to the flash 18 to effect light emission. A light control IC 20, in response to a light control start signal from the MPU 21, starts to monitor the amount of the light emitted by the flash 18 and reflected from the subject, and feeds a flash emission stop signal to the MPU 21 when the monitored amount of light reaches a predetermined amount that allows the subject to be shot with appropriate exposure. In response to this signal, the charging/flashing circuit 19 stops supplying the charged electric power to the flash 18.

The MPU 21 is composed of an exposure time setter 211, an underexposure checker 212, and a gain setter 213, and controls the entire digital camera under discussion.

A RAM (random access memory) 22 is used as a working area or the like of the MPU 21. An EEPROM (electricallyerasable programmable read-only memory) 23 is used to store various items of information necessary for controlling the digital camera, such as the settings of the entire digital camera, the conversion data used to convert the photometry data into the brightness of the subject (for example, conversion coefficients in the form of a table or coefficients for conversion formulae), the focal length data corresponding to the distance measurement data, the white balance value determined based on the color characteristics of the flash light emitted by the flash 18, the guide number (GNo) of the flash 18 corresponding to the sensitivity of the CCD 103 and the gain of the amplification circuit 111, and the open aperture value of the aperture stop 102.

The MPU 21 monitors the states of individual switches provided in an operation switch section 27 and performs necessary control to execute the operation specified by a switch operated. Moreover, the MPU 21 determines, by comparing the count value obtained from a built-in timer with a predetermined value (several minutes, for example), whether to stop or not the supply of electric power from a power source 29 to various parts of the camera. The MPU 21 also checks whether the voltage across the charging capacitor of the charging/flashing circuit 19 is lower than a predetermined reference level or not.

Moreover, the MPU 21 converts the photometry data fed from the photometry device 12 into the brightness of the subject by using the conversion data stored in the EEPROM 23, and performs calculation to determine a control aperture value in accordance with the brightness of the subject thus obtained. Then, the MPU 21, while monitoring the information on the aperture position fed from the aperture position detector 14, controls the aperture driving circuit 13 to drive the aperture stop 102 to the position corresponding to the control aperture value. The control aperture value may be determined by calculation using the brightness of the subject. It is also possible to use a predetermined table from which to select a control aperture value in accordance with the brightness of the subject.

The MPU 21 also performs, based on the distance measurement data fed from the distance measurement module 15 and the focal length data stored in the EEPROM 23, calculation to determine a defocus amount for the taking lens 101. Then, in accordance with the defocus amount thus calculated, the MPU 21, while monitoring the information on the lens position fed from the lens position detector 17, controls the focusing circuit 16 to drive the taking lens 101 to the in-focus position.

Moreover, the MPU 21 performs predetermined image processing on the image data fed from the ADC 112 (such as black level correction, white level correction, white balance adjustment, image interpolation, gradation correction using a lookup table or the like, image compression according to, for example, the JPEG (joint photographic image coding experts group) standard, and so forth).

The exposure time setter 211 sets the exposure time of the CCD 103 and feeds it to the CCD control circuit 104. When the flash 18 is not activated, the exposure time is set at an initial value in a predetermined way. For example, where a continuously-variable aperture is used, the initial exposure time may be set at a predetermined value, or, as with AE (automatic exposure) control, may be set, together with the control aperture value, at a value that achieves appropriate exposure based on the brightness of the subject. Once the image data is obtained, the exposure time is set at a value that is determined, as achieving appropriate exposure, based on the brightness level of the image data.

If the exposure time set here is longer than the maximum hand-shake-free period, a warning message is displayed on an LCD 242 (to be described later) to warn of a possibility of a hand shake. The maximum hand-shake-free period refers to the maximum length of exposure that does not allow a hand shake to cause a noticeable shake in the subject image. For example, if the focal length of the taking lens 101 is assumed to be f (mm), the maximum hand-shake-free period is about 1/f (second).

When the flash 18 is activated, in accordance with whether illuminating the subject with flash light results in appropriate exposure or underexposure, the exposure time is set to be equal to or longer than a predetermined length of time, for example 1/60 seconds. Specifically, when the subject lies within the distance range in which appropriate exposure is obtained with the maximum amount of flash light or less, the exposure time is set at a predetermined value. In contrast, when the subject lies at such a distance at which underexposure results even if the aperture stop 102 is fully opened and the flash 18 emits the maximum amount of flash light, the exposure time is set to be longer than the predetermined length of time.

When the subject lies far away from the camera, by setting the exposure time to be longer than the predetermined length of time, it is possible to illuminate the subject not only with flash light but also with ambient light and thereby obtain appropriate exposure. The exposure time thus set can be longer than the maximum hand-shake-free period. In order to set the exposure time, the exposure time setter 211 uses the check results fed from the underexposure checker 212 described below.

When the flash 18 is activated, the underexposure checker 212 checks whether the subject suffers from underexposure or not on the basis of the GNo of the flash 18, the open aperture value of the aperture stop 102, and the distance measurement data fed from the distance measurement module 15. Specifically, the underexposure checker 212 divides the GNo value of the flash 18 by the open aperture value, and, if the distance to the subject as represented by the distance measurement data fed from the distance measurement module 15 is greater than the resultant value, recognizes that the subject suffers from underexposure.

In contrast, when the flash 18 is not activated, the underexposure checker 212 checks whether the subject suffers from underexposure or not on the basis of the maximum hand-shake-free period. When appropriate exposure is not obtained within the maximum hand-shake-free period even if the aperture stop 102 is fully opened, the underexposure checker 212 recognizes that the subject suffers from underexposure.

The gain setter 213 sets the gain of the amplification circuit 111. The gain setter 213 sets the gain of the amplification circuit 111 at the same value irrespective of whether the flash 18 is activated or not. Note that, the exposure time setter 211 and the gain setter 213 may set the exposure time and the gain, respectively, in such a way that the exposure time multiplied by the gain remains constant. This makes it possible to obtain uniform image quality irrespective of the exposure time.

A display section 24 is composed of an LCD (liquid crystal display panel) 242 and an LCD driver 241. The LCD driver 241 drives the LCD 242 to display the image data and the character-based information fed from the MPU 21.

A recording medium 25 is, for example, a disk-shaped medium on which data is recorded magnetically or magneto-optically, or a semiconductor data storage device such as an IC memory card. The recording medium 25 is detachably attached to the digital camera under discussion. The recording medium 25 stores data such as its own type and remaining storage capacity. A reading/writing circuit 26 performs reading and writing of data from and to the recording medium 25. Moreover, on the basis of whether the reading/writing circuit 26 is able to read out data therefrom or not, the MPU 21 recognizes whether the recording medium 25 is present or not. Specifically, the MPU 21 recognizes, if data reading is possible, that the recording medium 25 is attached to the digital camera, and, if not, that the recording medium 25 is not attached to the digital camera.

The operation switch section 27 is composed of a plurality of switches including a power switch 271, a release switch 272, and a flash mode switch 273. The release switch 272 has two switches S1 and S2 which are turned on by half depression and by full depression, respectively. When the release switch 272 is pressed halfway in, the switch S1 is turned on and operations preparatory for shooting are executed; when the release switch 272 is pressed fully in, both of the switches S1 and S2 are turned on, and shooting operations are executed. The flash mode switch 273 is used to select one of the following three modes: the flash shooting mode in which flash light is always emitted; the automatic flash mode in which whether flash light is emitted or not is automatically determined in accordance with the brightness of the subject; and the ambient-light shooting mode in which flash light is never emitted.

An external terminal section 28 allows the digital camera under discussion to be connected to an external apparatus such as a personal computer or a printer so as to feed the data of the images taken to the external apparatus. The power source 29 is a secondary battery for supplying electric power to the circuits and drivers provided in the camera.

Figure 2:
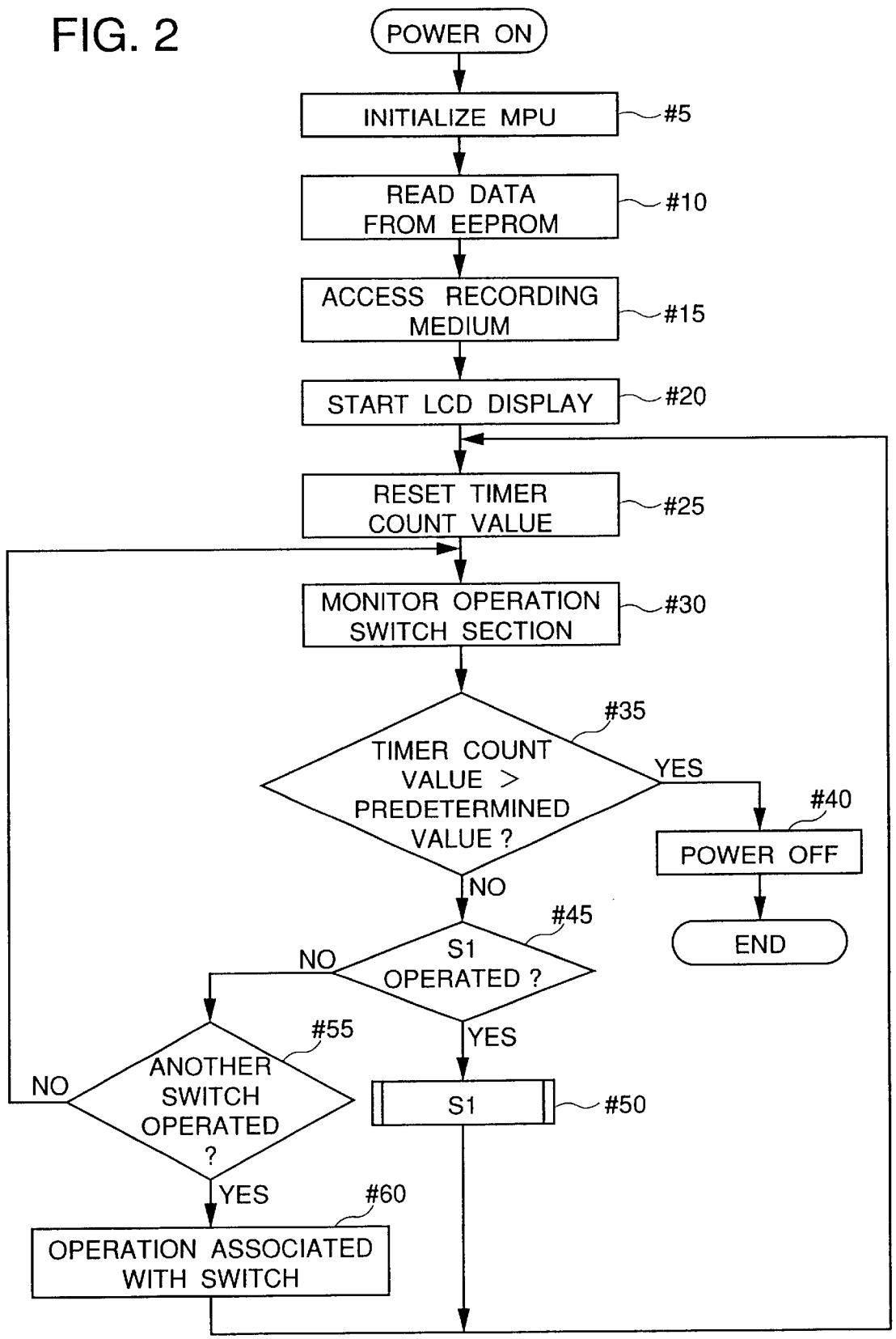
FIG. 2 is a flowchart showing the outline of the overall operations performed by the digital camera of the embodiment.

FIG. 2 is a flowchart showing the operation of the digital camera under discussion. When the power switch 271 is turned on, the power source 29 starts to supply electric power to various parts of the camera, and the MPU 21 is subjected to resetting and internal initialization (step #5). Then, the information on the previous settings stored in the EEPROM 23 is read out. The MPU 21 is initialized into the state that conforms to the information thus read out (step #10).

Next, through the reading/writing circuit 26, the data such as the kind and the remaining storage capacity of the recording medium 25 is read out (step #15). At this time, on the basis of whether reading of the data from the recording medium 25 is possible or not, whether the recording medium 25 is attached to the digital camera under discussion or not is checked. Then, the information obtained from the EEPROM 23 and the recording medium 25 is displayed on the LCD 242 (step #20). Thereafter, the count value of the timer is reset (step #25). Then, monitoring of the states of the individual switches provided in the operation switch section 27 is started (step #30).

Subsequently, whether the count value of the timer is greater than a predetermined value or not is checked (step #35). If the count value is found to be greater, the information on the current settings is stored in the EEPROM 23, and the supply of electric power to various parts of the camera is stopped except to the MPU 21, which needs to detect turning on of the power switch 271 (step #40). Then, the procedure shown in this flowchart comes to an end.

If, at step #35, the count value is found not to be greater, during the monitoring performed at step #30, whether the release switch 272 is pressed halfway in to turn on the switch S1 or not is checked (step #45). If the switch S1 is found on, the [S1] subroutine described later is executed to prepare for shooting (step #50), and the procedure returns to step #25.

If the switch S1 is found not on, during the monitoring performed at step #30, whether any other switch than the release switch 272 provided in the operation switch section 27 is operated or not is checked (step #55). If any other switch is found operated, the operation associated with that switch is executed (step #60), and the procedure returns to step #25. If, at step #55, no other switch is found operated, the procedure returns to step #30.

Figure 3:
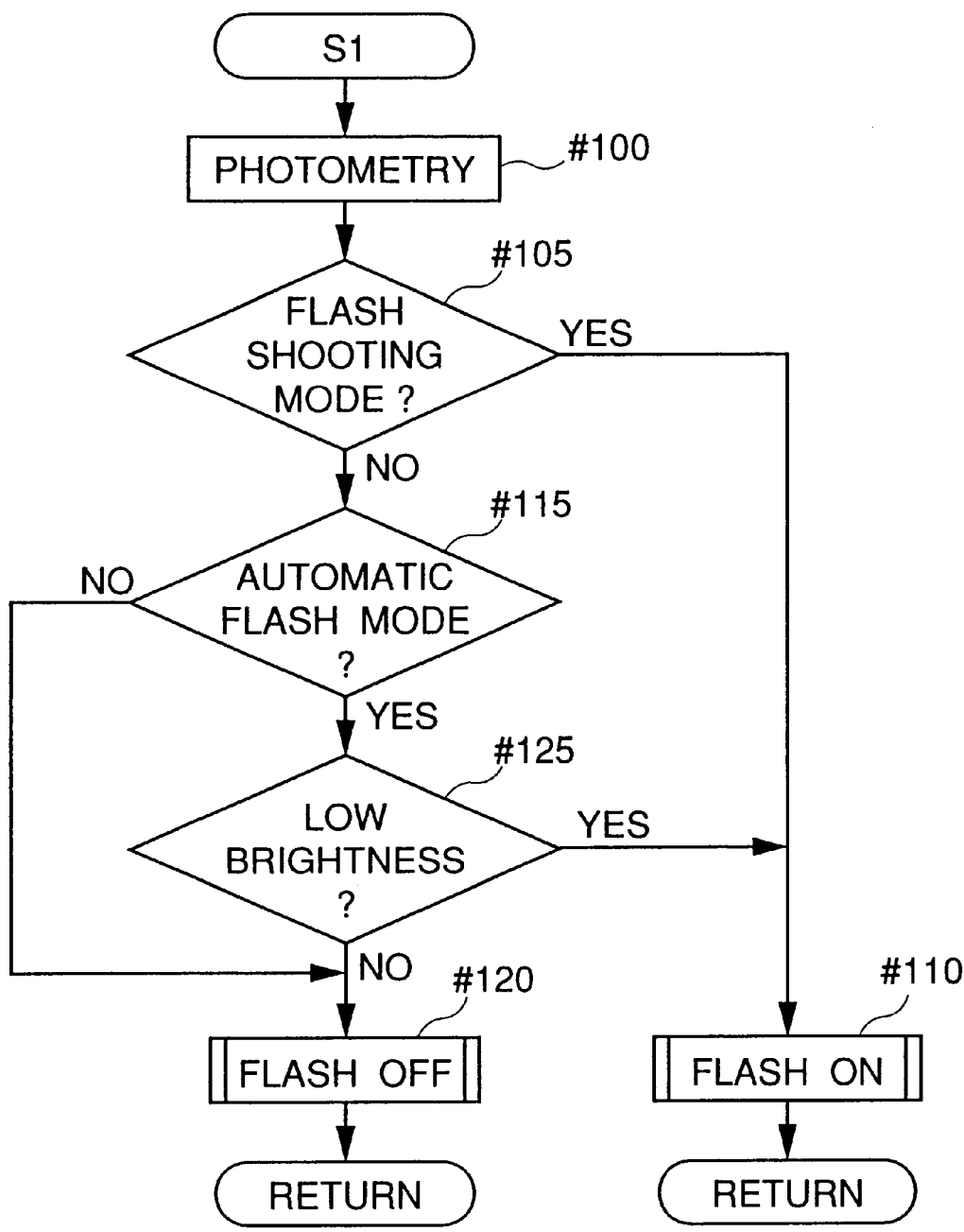
FIG. 3 is a flowchart showing the operations performed by the digital camera of the embodiment to prepare for shooting.

FIG. 3 is a flowchart of the [S1] subroutine that is executed to prepare for shooting. When the [S1] subroutine is called, the MPU 21 converts the photometry data fed from the photometry device 12 into the brightness of the subject using the conversion data stored in the EEPROM 23 (step #100).

Thereafter, whether or not the flash shooting mode is selected by operation of the flash mode switch 273 is checked (step #105). When the flash shooting mode is selected, the "flash-on" subroutine described later for shooting with light emission by the flash 18 is executed (step #110).

If, at step #105, the flash shooting mode is not selected, whether or not the automatic flash mode is selected by operation of the flash mode switch 273 is checked (step #115). If the automatic flash mode is not selected, the "flash-off" subroutine described later for shooting without light emission by the flash 18 is executed (step #120). When the automatic flash mode is selected, whether the brightness of the subject obtained at step #100 is lower than predetermined brightness or not is checked (step #125). If the brightness of the subject is found to be lower, the procedure proceeds to step #110, and otherwise the procedure proceeds to step #120.

Figure 4:
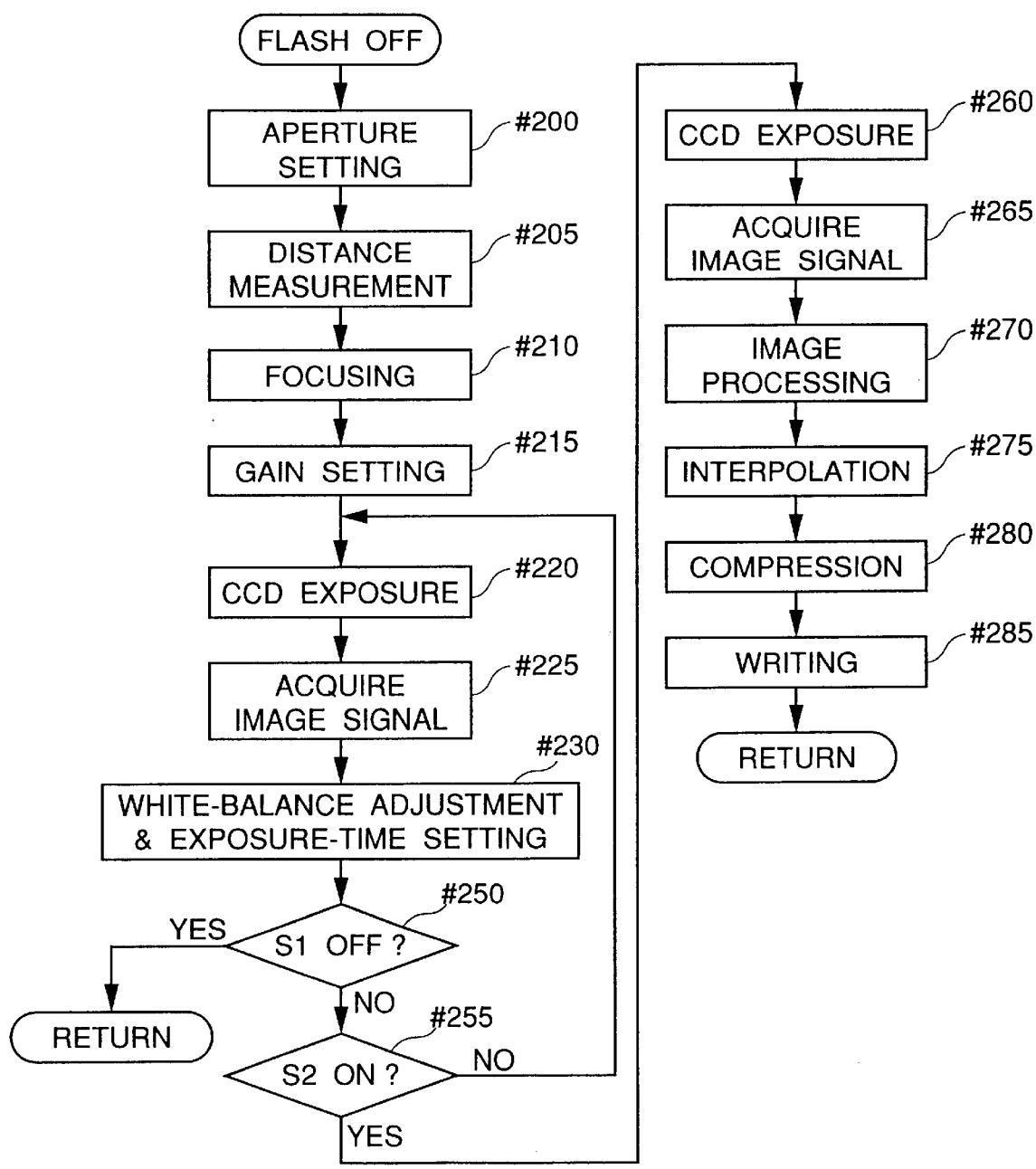
FIG. 4 is a flowchart showing the operations performed by the digital camera of the embodiment to perform shooting without flash light emission.

FIG. 4 is a flowchart of the "flash-off" subroutine for shooting without light emission by the flash 18. When the "flash-off" subroutine is called, the MPU 21 determines a control aperture value that corresponds to the brightness of the subject obtained at step #100 (FIG. 3). In accordance with the control aperture value thus determined, the MPU 21, while monitoring the information on the aperture position fed from the aperture position detector 14, controls the aperture driving circuit 13 to drive the aperture stop 102 to the position corresponding to the control aperture value (step #200).

Subsequently, the MPU 21 feeds a distance measurement command to the distance measurement module 15 to obtain distance measurement data (step #205). The MPU 21 determines, based on the focal length data corresponding to the distance measurement data, a defocus amount. In accordance with the defocus amount thus determined, the MPU 21, while monitoring the information on the lens position fed from the lens position detector 17, controls the focusing circuit 16 to drive the taking lens 101 to the in-focus position (step #210). Then, the gain of the amplification circuit 111 is set at a predetermined value (step #215).

Thereafter, the exposure time is set by the exposure time setter 211. The CCD 103 performs photoelectric conversion for the exposure time thus set (step #220). On completion of photoelectric conversion, the CCD 103 outputs an image signal (step #225), which is taken in by the signal processor 11. The image signal thus obtained is amplified by the amplification circuit 111 and is then subjected to analog-to-digital (A/D) conversion by the ADC 112 so as to be converted into image data. The image data is first stored in the RAM 22 temporarily so as to be subjected to various kinds of processing including black level correction, white level correction, and white balance adjustment. Then, the image data is read out from the RAM 22 so as to display the image taken on the LCD 242 for viewing before shooting (preview). Moreover, based on the brightness level of the image data thus obtained, the exposure time that achieves appropriate exposure is determined for the next shot (step #230).

Here, the white balance adjustment is performed based on the image data itself. The image data reflects the color characteristics of ambient light, and therefore the white balance adjustment is performed in accordance with the color characteristics of ambient light.

Subsequently, whether the switch S1 of the release switch 272 is off or not is checked (step #250). If the switch S1 is found off, the execution of the "flash-off" subroutine and of the [S1] subroutine is ended, and the procedure returns to step #25 in FIG. 2.

If, at step #250, the switch S1 is found not off, whether the switch S2 of the release switch 272 is on or not is checked (step #255). If the switch S2 is found not on, the procedure returns to step #220. Thus, the operations in steps #220 to #250 are repeated to perform white balance adjustment and calculate the exposure time at step #230. Note that, once an appropriate white balance and an appropriate exposure time are obtained, they are kept unchanged unless there is a change in the ambient conditions or the shooting range.

If, at step #255, the switch S2 is found on, the appropriate exposure time thus obtained is fed to the CCD control circuit 104. The CCD 103 performs photoelectric conversion for that exposure time (step #260). On completion of photoelectric conversion, the CCD 103 outputs an image signal (step #265), which is taken in by the signal processor 11.

The image signal thus obtained is amplified by the amplification circuit 111 and is then subjected to A/D conversion by the ADC 112 so as to be converted into image data. The image data is first stored in the RAM 22 temporarily so as to be subjected to black level correction and white level correction, and is then subjected to processing including white balance adjustment in accordance with the conditions determined at step #230 (step #270) and image correction by interpolation (step #275). Thereafter, the image data is read out from the RAM 22 so as to display the image taken on the LCD 242 for viewing after shooting (after view). Furthermore, the image data in the RAM 22 is subjected to image compression according to, for example, the JPEG standard (step #280), and is then recorded on the recording medium 25 by way of the reading/writing circuit 26 (step #285). Then, the execution of the "flash-off" subroutine and of the [S1] subroutine is ended, and the procedure returns to step #25 in FIG. 2.

Figure 5:
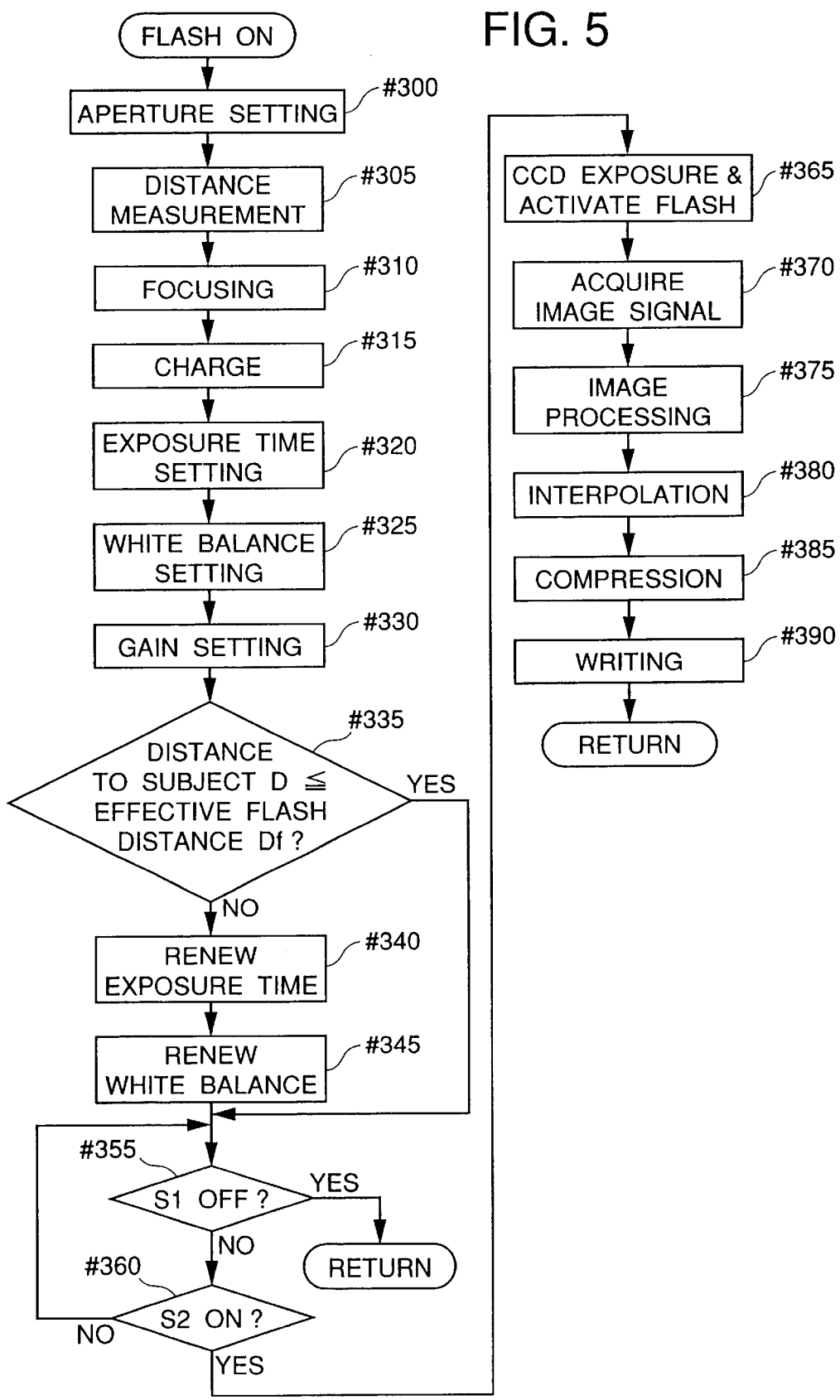
FIG. 5 is a flowchart showing the operations performed by the digital camera of the embodiment to perform shooting with flash light emission.

FIG. 5 is a flowchart of the "flash-on" subroutine that is executed to perform shooting with light emission by the flash 18. When the "flash-on" subroutine is called, the MPU 21 determines a control aperture value that corresponds to the open aperture. In accordance with the control aperture value thus determined, the MPU 21, while monitoring the information on the aperture position fed from the aperture position detector 14, controls the aperture driving circuit 13 to drive the aperture stop 102 to the open aperture position (step #300).

Subsequently, the MPU 21 feeds a distance measurement command to the distance measurement module 15 to obtain distance measurement data (step #305). The MPU 21 determines, based on the focal length data corresponding to the distance measurement data, a defocus amount. In accordance with the defocus amount thus determined, the MPU 21, while monitoring the information on the lens position fed from the lens position detector 17, controls the focusing circuit 16 to drive the taking lens 101 to the in-focus position (step #310).

Thereafter, the MPU 21 checks whether the voltage across the charging capacitor of the charging/flashing circuit 19 is lower than a predetermined reference level or not. If the voltage is found to be lower, the MPU 21 feeds a charge command to the charging/flashing circuit 19 to start charging (step #315).

Thereafter, by the exposure time setter 211, the exposure time is set to be equal to the predetermined length of time mentioned previously (step #320). The white balance is so set as to be adjusted in accordance with the white balance adjustment value calculated based on the color characteristics of flash light stored in the EEPROM 23 (step #325). Then, the gain of the amplification circuit 111 is set by the gain setter 213 (step #330). The value of the gain thus set is fed to the light control IC 20.

Thereafter, the underexposure checker 212 checks whether or not the subject lies within the distance range in which appropriate exposure is obtained with the flash light emitted by the flash 18 (step #335). Specifically, the underexposure checker 212 reads out the GNo of the flash 18 from the EEPROM 23, and divides the value of the GNo by the open aperture value in order to determine a subject distance Df (hereafter referred to as the effective flash distance) at which appropriate exposure is obtained with the maximum amount of flash light emitted by the flash 18. Then, by comparing the distance to the subject D represented by the distance measurement data obtained at step #305 with the effective flash distance Df, whether the subject lies within the distance range in which appropriate exposure is achieved with the flash light or not is determined.

When the distance to the subject D is equal to or shorter than the effective flash distance Df, the procedure proceeds to step #355. When the distance to the subject D is longer than the effective flash distance Df, i.e., in a case where, even if the aperture stop 102 is fully opened and the flash 18 emits the maximum amount of flash light, the brightness of the subject fails to reach the level that achieves appropriate exposure, the exposure time is set anew at a value that is greater than the value of the predetermined length of time set at step #320 (step #340). Moreover, the white balance adjustment is set anew so as to be performed in accordance not with the predetermined white balance adjustment value stored in the EEPROM 23 but with the data of the taken image itself, i.e., with the color characteristics of ambient light (step #345).

When the subject cannot be illuminated to appropriate brightness with the flash light alone, by setting the exposure time longer, it is possible to use ambient light to compensate for shortage of light and thereby obtain appropriate exposure. Moreover, as the exposure time is made longer, the ratio of the amount of flash light used for illuminating the subject during flash shooting to that of ambient light varies in such a way that the proportion of the latter increases. In this case, by performing the white balance adjustment in accordance not with the color characteristics of the flash light but with the color characteristics of the ambient light, it is possible to achieve a more appropriate white balance.

Subsequently, whether the switch S1 of the release switch 272 is off or not is checked (step #355). If the switch S1 is found off, the execution of the "flash-off" subroutine and of the [S1] subroutine is ended, and the procedure returns to step #25 in FIG. 2.

If, at step #355, the switch S1 is found not off, whether the switch S2 of the release switch 272 is on or not is checked (step #360). If the switch S2 is found not on, the procedure returns to step #355.

If, at step #360, the switch S2 is found on, the exposure time set at step #320 or the exposure time set anew at step #340 is fed to the CCD control circuit 104. The CCD 103 performs photoelectric conversion for the exposure time thus obtained. After photoelectric conversion is started, a light control start signal is fed to the light control IC 20 to start monitoring of the amount of light emitted by the flash 18 and reflected from the subject. Immediately after the start of monitoring, a trigger signal is fed to the charging/flashing circuit 19 to make the flash 18 emit light (step #365).

If the distance to the subject D is equal to or shorter than the effective flash distance Df, the amount of light being monitored reaches an appropriate amount before the charged electric power runs out in the charging/flashing circuit 19. At that time, a flash emission stop signal is generated. In response to the flash emission stop signal, a command is supplied to the charging/flashing circuit 19 to stop supplying the charged electric power to the flash 18. As a result, the flash 18 stops light emission and automatic light amount adjustment is performed. In this case, at the end of the exposure time which is set to be equal to the predetermined length of time, photoelectric conversion is ended. On the other hand, if the distance to the subject D is longer than the effective flash distance Df, the amount of light being monitored never reaches the appropriate amount even after the charged electric power runs out in the charging/flashing circuit 19. In this case, at the end of the exposure time which is set to be longer than the predetermined length of time, photoelectric conversion is ended.

Subsequently, the CCD 103 outputs an image signal (step #370), which is taken in by the signal processor 11. The image signal thus obtained is amplified by the amplification circuit 111 and is then subjected to A/D conversion by the ADC 112 so as to be converted into image data. The image data is first stored in the RAM 22 temporarily so as to be subjected to black level correction and white level correction, and is then subjected to processing including white balance adjustment in accordance with the value set at step #325 or the value set anew at step #345 (step #375) and image correction by interpolation (step #380).

Thereafter, the image data is read out from the RAM 22 so as to display the image taken on the LCD 242 for viewing after shooting (after view). Furthermore, the image data in the RAM 22 is subjected to image compression according to, for example, the JPEG standard (step #385), and is then recorded on the recording medium 25 by way of the reading/writing circuit 26 (step #390). Then, the execution of the "flash-on" subroutine and of the [S1] subroutine is ended, and the procedure returns to step #25 in FIG. 2.

As will be understood from the foregoing, in flash shooting, when illuminating the subject with flash light results in appropriate exposure, the exposure time is set to be equal to a predetermined length of time, and the white balance of the image taken is adjusted uniformly based on the color characteristics of the flash light. In contrast, when illuminating the subject with flash light results in underexposure, the exposure time is set to be longer than the predetermined length of time in order to compensate for shortage of light by the use of ambient light, and the white balance of the image taken is adjusted in accordance with the color characteristics of the ambient light. As a result, irrespective of whether the subject lies relatively close to or considerably far away from the camera, it is possible to obtain an image of the subject with appropriate exposure and with an appropriate color balance.

Note that, in the above described embodiment, whether appropriate exposure is obtained with flash light or not is checked prior to flash shooting based on the open aperture value of the aperture stop 102, the GNo of the flash 18, and the distance to the subject measured by the distance measurement module 15. However, this check does not necessarily have to be made prior to flash shooting. Alternatively, it is possible to set the exposure time to be equal to a predetermined length of time prior to flash shooting so that, if a light control IC feeds a flash emission stop signal before the end of the exposure time, photoelectric conversion is ended at the end of that exposure time and, if the light control IC does not feed a flash emission stop signal before the end of the exposure time, the exposure time is extended.

Obviously, many modifications and variations of the present invention are possible in light of the above teachings. It is therefore to be understood that within the scope of the appended claims, the invention may be practiced other than as specifically described.

What is claimed is:

1. A digital camera comprising:
    a photoelectric conversion device for sensing light from a subject to generate image data of the subject;
    a flash for emitting light to illuminate the subject; and
    a time setter for setting, when shooting is performed using the light emitted by the flash, a photoelectric conversion time for which the photoelectric conversion device performs photoelectric conversion in accordance with a distance to the subject,
    wherein the time setter sets the photoelectric conversion time to be equal to a predetermined length of time when the distance to the subject is equal to or shorter than a predetermined distance.

2. A digital camera as claimed in claim 1,
    wherein the time setter sets the photoelectric conversion time to be longer than the predetermined length of time when the distance to the subject is longer than the predetermined distance.

3. A digital camera as claimed in claim 1,
    wherein the predetermined length of time is determined based on a guide number of the flash.

4. A digital camera as claimed in claim 1, further comprising:
    a balance adjuster for performing white balance adjustment on the image data generated by the photoelectric conversion device.

5. A digital camera as claimed in claim 4,
    wherein the balance adjuster performs white balance adjustment based on color characteristics of the light emitted by the flash when the distance to the subject is equal to or shorter than a predetermined distance.

6. A digital camera as claimed in claim 5,
    wherein the balance adjuster performs white balance adjustment based on color characteristics of ambient light when the distance to the subject is longer than the predetermined distance.

7. A digital camera as claimed in claim 1,
    wherein, whether shooting is performed using light emitted by the flash, ambient light, or a combination thereof, the predetermined length of time is a maximum handshake-free period, wherein the maximum hand-shake-free period is a maximum photoelectric conversion time that does not allow a shake of a hand to cause a substantially noticeable distortion of the subject image data.

8. A digital camera as claimed in claim 1, further comprising:

a checker for checking an exposure condition of the subject image data;

an amplification circuit; and a gain setter for setting a gain of the amplification circuit, wherein when the checker recognizes an under exposure condition, the gain and the photoelectric conversion time are respectively set in such a way that the photoelectric conversion time multiplied by the gain remains constant.

9. A digital camera comprising:

a photoelectric conversion device for sensing light from a subject to generate image data of the subject;

a flash for emitting light to illuminate the subject;

a first time setter for setting, when shooting is performed using the light emitted by the flash, a photoelectric conversion time for which the photoelectric conversion device performs photoelectric conversion to be equal to a predetermined length of time when a distance to the subject is equal to or shorter than a predetermined distance that corresponds to a guide number of the flash;

a second time setter for setting, when shooting is performed using the light emitted by the flash, the photoelectric conversion time for which the photoelectric conversion device performs photoelectric conversion to be longer than the predetermined length of time when the distance to the subject is longer than the predetermined distance;

a first balance adjuster for performing white balance adjustment on the image data generated by the photoelectric conversion device based on color characteristics of the light emitted by the flash when the distance to the subject is equal to or shorter than the predetermined distance; and a second balance adjuster for performing white balance adjustment on the image data generated by the photoelectric conversion device based on color characteristics of ambient light when the distance to the subject is longer than the predetermined distance.

10. A digital camera that shoots an image by means of a photoelectric conversion device and that is capable of performing flash shooting by emitting flash light to illuminate a subject, during photoelectric conversion, wherein, in flash shooting, when the subject lies within a distance range in which the flash light can illuminate the subject with predetermined brightness, a photoelectric conversion time for which the photoelectric conversion device performs photoelectric conversion is set to be equal to a predetermined length of time, and, when the subject lies outside the distance range, the photoelectric conversion time for which the photoelectric conversion device performs photoelectric conversion is set to be longer than the predetermined length of time.

11. A digital camera as claimed in claim 10, wherein, when flash shooting is performed with the photoelectric conversion time of the photoelectric conversion device set to be equal to the predetermined length of time, the image shot is subjected to white balance adjustment performed based on color characteristics of the flash light, and, when flash shooting is performed with the photoelectric conversion time of the photoelectric conversion device set to be longer than the predetermined length of time, the image shot is subjected to white balance adjustment performed based on color characteristics of ambient light.

12. A method of operating a digital camera to generate image data of a subject, the method comprising the steps of:

performing photoelectric conversion using a photoelectric conversion device for sensing light from the subject in order to generate the image data of the subject;

emitting light from a flash to illuminate the subject; and when shooting is performed using the light emitted by the flash, setting a photoelectric conversion time for which the photoelectric conversion device performs photoelectric conversion in accordance with a distance to the subject, wherein when the distance to the subject is equal to or shorter than a predetermined distance, the photoelectric conversion time is set equal to a predetermined length of time.

\* \* \* \* \*